3,303,196
METHOD OF PREPARING CHLORINATED PYRIDINE DERIVATIVES

John Anthony Corran, Runcorn, England, assignor to Imperial Chemical Industries Limited, London, England, a corporation of Great Britain
No Drawing. Filed May 11, 1964, Ser. No. 366,601
Claims priority, application Great Britain, May 23, 1963, 20,636/63; Jan. 8, 1964, 876/64
11 Claims. (Cl. 260—290)

This invention relates to a process for the manufacture of derivatives of pyridine and substituted pyridines, and more particularly to a liquid-phase process for the manufacture of halogenated derivatives of pyridine and substituted pyridines.

Compared with benzene, the pyridine nucleus is relatively unreactive towards electrophilic reagents. In particular, halogenation of the pyridine nucleus is relatively difficult and the drastic conditions hitherto employed, often at elevated temperatures, have been inconvenient and have led to poor yields of the desired halogenated pyridines.

It has now been found that pyridine and substituted pyridines can be halogenated very conveniently in the liquid phase by forming a complex between pyridine or the substituted pyridine and a metallic salt and treating this complex with an halogenating agent in a liquid phase.

Thus according to the present invention there is provided a process for the manufacture of nuclear-halogenated derivatives of pyridine which comprises forming a complex between pyridine or a substituted pyridine and a metal salt and treating the said complex in a liquid phase with an halogenating agent.

Most metallic ions capable of forming hydrates or other co-ordination complexes have been observed to react with pyridine or substituted pyridines to form complexes. Many, but not all, of these complexes are of the type $(MX_2)A_2$, where A is pyridine or a substituted pyridine, M is the metal and X is the anion of the metallic salt.

The metal salts used for complex formation in this process may be, for instance, salts of metals of variable valency such as those with atomic numbers 21 to 30. It is preferred to use salts of nickel or cobalt. When a nickel salt is used an especially high degree of halogenation of the pyridine is achieved.

The metal salt used is preferably a halide corresponding to the required halogenated derivative; for example in a chlorination reaction it is preferred to use a metal chloride for complex formation.

Suitable starting materials include pyridine itself and compounds containing in their structure a pyridine ring bearing one or more substituents, for example alkyl substituents.

The halogenating agent may be, in particular, a chlorinating agent but other halogenating agents, for example brominating agents, may also be used. As chlorinating agent it is preferred to use sulphuryl chloride, $SO_2Cl_2$, although other chlorinating agents, for example chlorine itself, may be used.

An inert solvent of the type commonly used in liquid-phase halogenation reactions may be used, for example carbon tetrachloride or hexachlorobutadiene.

When the complex between the pyridine and the metal salt is a crystalline solid it is often convenient to prepare the complex in a separate stage by mixing the components in the proportions required to form the solid complex (commonly 1 mole of the metal salt to 2 moles of pyridine or substituted pyridine) in a solvent, for example ethanol, and separating the complex by filtration. The complex may then be treated with the halogenating agent, conveniently at about 50° C. Reaction may also be carried out at other temperatures, but most conveniently at or slightly below the boiling point of the mixture.

When sulphuryl chloride is used as a chlorinating agent, it is preferred to use between 2 and 20 moles of sulphuryl chloride per mole of pyridine or substituted pyridine.

At the end of the reaction period the solvent may be removed by distillation and the reaction product, comprising halogenated pyridines may be separated from the residue by known techniques such as distillation, steam distillation, solvent extraction or combination of such techniques. The reaction products may similarly be separated from one another as desired.

When sulphuryl chloride is used as the chlorinating agent, sulphur dioxide is evolved as a by-product and this may be converted into sulphuryl chloride and recycled to the process. The metal component of the complex may be recovered from the reaction residue if desired, for example by extracting the residue with dilute aqueous acid and subsequently precipitating the metal oxide and/or hydroxide with aqueous alkali.

The halogenated pyridines, for example the chloropyridines, are valuable as starting materials in the manufacture of a wide range of pyridine derivatives, the availability of which has hitherto been limited by the relative inconvenience and inefficiency of the known methods of introducing halogen as a substituent in the pyridine nucleus. Chloropyridines and their derivatives show fungicidal, pesticidal and herbicidal activity.

The invention is illustrated but not limited by the following examples in which parts are parts by weight.

Example 1

23.8 parts of nickel chloride hexahydrate were dissolved in 240 parts of ethanol at 60° C. A mixture of 15.8 parts of pyridine and 80 parts of ethanol was added with stirring. On cooling to room temperature the pyridine/nickel chloride complex separated out in the form of yellow-green needles. Analysis showed that the complex contained 2 moles of pyridine per mole of nickel chloride.

60 parts of the pyridine/nickel chloride complex were powdered and suspended in 400 parts of carbon tetrachloride. 375 parts of sulphuryl chloride were added with stirring over a period of 1 hour, the mixture was then maintained at 50–55° C. for 20 hours and finally heated under reflux for 5 hours. Sulphur dioxide and hydrogen chloride were evolved during the reaction period, at the end of which the carbon tetrachloride was removed by distillation. The cooled residue was treated with 100 parts of cold water. There were thus obtained 15.2 parts of a white solid together with a green aqueous solution.

The white solid product, after being washed with water and dried, melted in the range 160–180° C. and contained 65.0% by weight of chlorine. The product was soluble in chloroform, in tetrahydrofuran and in dimethylformamide.

Example 2

90 parts of cobalt chloride hexahydrate were dissolved in 160 parts of ethanol at 60° C. A mixture of 60 parts of pyridine and 80 parts of ethanol was added with stirring. On cooling to room temperature 60 parts of pyridine/cobalt chloride complex separated out in the form of purple crystals. Analysis showed that the purple crystalline complex contained 2 mols of pyridine per mole of cobalt chloride.

51 parts of the purple crystalline complex were powdered and 300 parts of sulphuryl chloride were added in portions over a period of 14 hours while the temperature of the mixture was maintained at 50–60° C. Sulphur dioxide and hydrogen chloride were evolved during this period, at the end of which the excess sulphuryl chloride was distilled off from the reaction mixture at atmospheric pressure leaving a blue-green powder as residue. Vacuum distillation of the powder at 2–10 mm. Hg gave as product 15.5 parts of distillate which partially crystallised on cooling to room temperature. Analysis of this product showed that it contained 41.7% by weight of chlorine. Analysis by mass spectrometry showed the presence of one or more monochloropyridines, $C_5H_4ClN$, one or more dichloropyridines, $C_5H_3Cl_2N$ and one or more trichloropyridines, $C_5H_2Cl_3N$.

*Example 3*

20 parts of the purple pyridine/cobalt chloride complex, prepared as described in Example 2, were powdered and suspended in 240 parts of carbon tetrachloride. Chlorine was bubbled through the suspension for 1½ hours while the mixture was maintained at reflux temperature. At the end of the period the mixture was cooled to room temperature and 20 parts of a blue solid were separated by filtration. On distillation at atmospheric pressure the blue solid yielded one half of its own weight of a distillate. Analysis by mass spectrometry showed that the distillate contained one or more monochloropyridines and one or more dichloropyridines.

What is claimed is:

1. A process for the manufacture of nuclear-chlorinated derivatives of pyridine which comprises forming a complex between a pyridine and a salt of a metal selected from the group consisting of nickel and cobalt and treating the said complex in a liquid phase with a chlorinating agent.

2. A process as claimed in claim 1 wherein the metal salt is a salt of nickel.

3. A process as claimed in claim 1 wherein the metal salt is a salt of cobalt.

4. A process as claimed in claim 1 wherein the metal salt is a chloride.

5. A process as claimed in claim 1 wherein the chlorinating agent is sulphuryl chloride.

6. A process as claimed in claim 5 wherein between 2 and 20 moles of sulphuryl chloride are used per mole of pyridine or substituted pyridine.

7. A process as claimed in claim 1 wherein the chlorinating agent is chlorine.

8. A process as claimed in claim 1 wherein the reaction is carried out in the presence of an inert solvent.

9. A process as claimed in claim 8 wherein the inert solvent is carbon tetrachloride or hexachlorobutadiene.

10. A process as claimed in claim 1 wherein the reaction is carried out at a temperature between 50° C. and 60° C.

11. A process for the manufacture of nuclear-chlorinated derivatives of pyridine which comprises forming a complex between pyridine and a salt of nickel or cobalt and interacting the said complex in a liquid phase with a chlorinating agent.

References Cited by the Examiner

Houben-Wehl, Meth. Org. Chemie, Chlorine Verbindugen, Vol. 3, Verlag 1962, page 727.

WALTER A. MODANCE, *Primary Examiner.*

ALAN L. ROTMAN, *Assistant Examiner.*